3,466,103
HYDROSTATIC THRUST BEARINGS

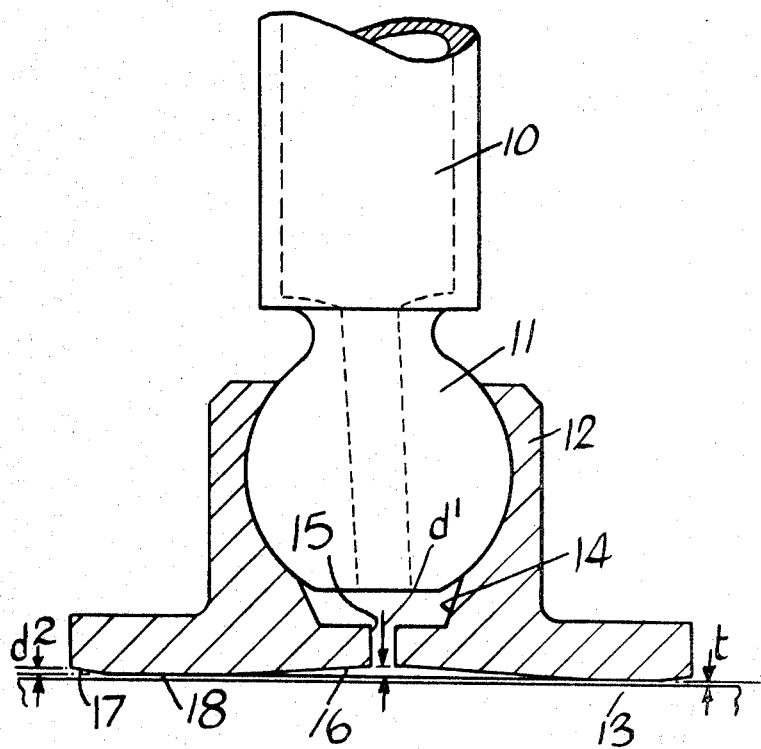

Anthony Roger Davies, Birmingham, and John Peter O'Donoghue, Coventry, England, assignors to Joseph Lucas (Industries) Limited, Birmingham, England
Filed Dec. 11, 1967, Ser. No. 689,561
Claims priority, application Great Britain, Dec. 15, 1966, 56,172/66
Int. Cl. F16c *17/06, 17/08, 17/14*
U.S. Cl. 308—160                                      3 Claims

ABSTRACT OF THE DISCLOSURE

A thrust bearing comprising a part having a recess and an entry passage for fluid to the space defined, in use, between the part and a member, the recess extending from the entry passage to the inner edge of a flat land portion, the maximum depth of the recess being between 0.5 and 10 times the film thickness, when the load is at a mean value, and an external taper on the part having a depth between 0.5 and 10 times the film thickness.

---

This invention relates to thrust bearings of the kind in which a part thereof has a recess in its operative face, to the interior of which, in use, fluid under pressure is supplied through an entry passage in order to provide a force acting between said part and a member to maintain said part in a position so that there is established between the operative face or land of the part and the member, a film of fluid. A bearing of this kind will for convenience be referred to as being of the kind specified. Such a thrust bearing, when relative movement of the part and member takes place in a direction parallel to the surfaces, is usually referred to as a hydrodynamic bearing, though it is to be understood that liquid or gaseous media may be employed.

It is important, despite changing load conditions, in use, that the film thickness should be maintained as near constant as possible, the rate of change of film thickness in relation to load being referred to as stiffness. It is furthermore of importance in most applications that the film thickness be maintained at or near a practical minimum commensurate with the stiffness requirement. Moreover, since there is relative movement in the direction parallel to the surface, there is a tendency for there to be tilting.

One known form of such a thrust bearing has a recess in the part, which is fed with fluid under pressure through a restricted feed orifice in the part, the proportions of the recess, however, in relation to the film thickness, being such that the restriction to flow which it affords in relation to the restriction to flow through the orifice and through the space defined between the part and member, at which the film is formed, is insignificant.

Moreover, in some appliactions, such as slippers for use at the piston ends of an hydraulic swash plate type pump or motor, the arrangement including a severely restricted feed orifice does not fully meet the requirements in that it provides a relatively slow response to changes in the load on the bearing, such a changing load, in this case, resulting from changes in the fluid pressure acting on the pistons, as the pump or motor operates, the changes in load in such a machine occurring with great frequency and being of substantial magnitude.

The object of the present invention is to provide a thrust bearing of the kind specified in a convenient form in which optimum operating conditions can more nearly be achieved.

In accordance with the present invention a thrust bearing of the kind specified is characterised in that the recess in said part reduces in depth from a position at or near the entry passage for fluid to the inner edge of a flat land portion, remote from the entry passage, the maximum depth of the recess being between 0.5 and 10 times the intended film thickness in use, when the load is at a mean value in the range over which the bearing is intended to operate, and the part having an external taper extending from the outer edge of the part to the outer edge of the flat land portion, the outer edge of the taper being out of the plane of the flat land portion by a distance between 0.5 and 10 times the film thickness.

The invention will now be described by way of example with reference to the accompanying drawing, the single figure of which illustrates, on a large scale, a construction of slipper for use on the end of a piston for an hydraulic swash-plate type pump or motor.

The example illustrated includes a piston 10 intended for mounting in a rotatable cylinder block within the body of an hydraulic swash-plate type pump or motor, the piston having a spherical end 11 engaging in a complementary cup formed in a slipper 12. The slipper is intended to act against an angularly disposed swash-plate 13 non-rotatably mounted within the body of the pump or motor, and the piston 10 is hollow, so as to provide a passageway for the entry of liquid being pumped, to a space 14 within the interior of the slipper 12, there being a passage 15 affording communication between this space 14 and the face of the swash-plate 13.

It is a feature of pumps and motors of this kind that the load applied to the slipper 12 through the piston 10 changes with considerable rapidity, and through a substantial range as the pump or motor operates, the range of pressures being, for example, between zero and three thousand pounds per square inch, and if the pump or motor is rotating at, for example, three thousand revolutions per minute, changes from one end of this range of pressures to the other may occur, three thousand times per minute.

It is desired in use to maintain between the adjacent faces of the slipper 12 and of the swash-plate 13, a film of liquid, and the passage 15 affords means whereby liquid is supplied to this region. It is desirable that the film thickness indicated at $t$ in the drawings shall be maintained at a practical minimum so that leakage from the interior of the bores containing the pistons 10 is kept to a minimum, but it is furthermore important that the film shall be maintained as near constant in thickness as possible, despite the changes in load which occur.

In order to achieve this, the operative face or land of the slipper 12 is provided with a central recess 16 of shallow tapered form as illustrated, the maximum depth of the taper indicated at $d_1$ in the drawings is in the range 0.5 to 10 times the thickness $t$ of the film. This recess extends from the position of the entry passage 15 to the inner annular edge of a flat land portion 18.

For the purpose of this definition, the film thickness is considered to be that obtaining when the load upon the piston 10 is at an optimum value corresponding to a mean load between the high and low limits of the load range.

It has been found that this arrangement affords great stiffness of the thrust bearing in that the film thickness $t$ varies relatively little over the range of loads, and furthermore this arrangement affords rapid response to changes in the load upon the piston, since there is substantially no restriction to flow between the interior of the piston 10 and the recess 16, so that pressure conditions obtaining in the piston 10 are reflected in the recess 16 substantially simultaneously.

The flat land portion 18 surrounding the outer edge of the recess 16 has, between its outer edge and the outside of the slipper, a shallow taper 17, the depth $d_2$ of which with respect to the plane of the flat land portion, at the outside edge, is between 0.5 and 10 times the film thickness $t$. In the example shown the length of this taper is 0.06 inch and the angle is 3°, the outside diameter of the slipper being 1.22 inches and the radial width of the flat portion of the face 0.1 inch.

This arrangement provides means for counteracting the tendency for tilting of the slipper with respect to the swash-plate as the slipper moves over it in a direction parallel to the adjacent surfaces of these parts.

The tapered surfaces of the recess 16 and at 17 or either of them may be shaped as concave or convex forms in order to vary the characteristic performance of the bearing.

In a further alternative construction, the recess 16 is of shallow cylindrical form, but its maximum depth corresponds to the limits herein defined in relation to the film thickness.

It is contemplated that the thrust bearing may be suitable for use in other applications, where similar considerations as to change in load and resistance to tilting are significant. It may be convenient to provide a restriction in the passage 15, thus providing, in effect, a liquid potentiometer having two restrictions, one in the passage 15 and the other formed by the flat land portion, this providing, in use, a liquid pressure intermediate the two restrictions within the recess 16 of near constant value, such an arrangement affording very high stiffness over a relatively wide range of film thicknesses.

Having thus described our invention what we claim as new and desire to secure by Letters Patent is:

1. A thrust bearing comprising a member and a part, co-operating surface portions on the member and part respectively, a recess in the surface of the part, an entry passage in the part for entry of fluid under pressure to said recess, to establish a film of fluid between the surfaces of the part and the member, to provide a force acting between the surfaces, the recess reducing in depth from the entry passage, to the inner edge of a land portion of the surface surrounding the recess, the maximum depth of the recess being between 0.5 and 10 times the film thickness in use, when the load is at a mean value in the range over which the bearing is intended to operate, the part having an external taper extending from the outer edge of the land portion to the outer edge of the part, the outer edge of the taper being out of the plane of the land portion by a distance between 0.5 and 10 times the film thickness.

2. A thrust bearing comprising a member and a part, co-operating surface portions on the member and part respectively, a circular recess in the surface of the part, an entry passage in the part at the centre of the recess for entry of fluid under pressure to said recess, to establish a film of fluid between the surfaces of the part and the member, to provide a force acting between the surfaces, the recess reducing in depth from the entry passage, to the inner edge of an annular flat land portion of the surface surrounding the recess, the maximum depth of the recess being between 0.5 and 10 times the film thickness in use, when the load is at a mean value in the range over which the bearing is intended to operate, the part having an external annular taper extending from the outer edge of the flat land portion to the outer edge of the part, the outer edge of the taper being out of the plane of the flat land portion by a distance between 0.5 and 10 times the film thickness.

3. A slipper for a piston end for a hydraulic swash plate type machine, the machine having a swash plate having a surface with which a complementary surface of the slipper co-operates, the slipper surface having a recess, an entry passage for fluid under pressure to said recess to establish a film of fluid between the surfaces of the slipper and the swash plate to provide a force acting between said surfaces, the recess reducing in depth from the entry passage to the inner edge of a land portion surrounding the recess, the maximum depth of the recess being between 0.5 and 10 times the film thickness in use, when the load is at a mean value in the range over which the machine is intended to operate, and the slipper having an external taper extending from the outer edge of the land portion to the outer edge of the slipper, the outer edge of the taper being out of the plane of the land portion by a distance between 0.5 ond 10 times the film thickness.

References Cited

UNITED STATES PATENTS

| 3,232,056 | 2/1966 | Heinrich et al. | 103—162 |
| 3,267,871 | 8/1966 | Lee et al. | 103—162 |

FOREIGN PATENTS

| 913,549 | 12/1962 | Great Britain. |

MARTIN P. SCHWADRON, Primary Examiner

F. SUSKO, Assistant Examiner